(12) United States Patent
Hoffmann

(10) Patent No.: US 7,419,282 B2
(45) Date of Patent: Sep. 2, 2008

(54) RECESSED LIGHTING FIXTURE

(76) Inventor: Friedemann Hoffmann, Poligono Industrial El REGAS c/dels Oficis, 25B, E-08850 Gava (Barcelona) (ES)

( * ) Notice: Subject to any disclaimer, the term of this patent is extended or adjusted under 35 U.S.C. 154(b) by 0 days.

(21) Appl. No.: 10/590,246

(22) PCT Filed: Mar. 23, 2005

(86) PCT No.: PCT/ES2005/000158

§ 371 (c)(1),
(2), (4) Date: Aug. 22, 2006

(87) PCT Pub. No.: WO2005/093321

PCT Pub. Date: Oct. 6, 2005

(65) Prior Publication Data

US 2007/0189021 A1 Aug. 16, 2007

(30) Foreign Application Priority Data

Mar. 25, 2004 (ES) .............................. 200400735 U

(51) Int. Cl.
*F21V 15/00* (2006.01)

(52) U.S. Cl. .................. 362/364; 362/375; 362/147
(58) Field of Classification Search ................. 362/145, 362/147, 148, 364, 368, 404, 365, 375
See application file for complete search history.

(56) References Cited

U.S. PATENT DOCUMENTS 4,754,377 A * 6/1988 Wenman ..................... 362/148

* cited by examiner

*Primary Examiner*—John A Ward
(74) *Attorney, Agent, or Firm*—Notaro & Michalos P.C.

(57) ABSTRACT

This lighting fixture is made up of a translucent front plate (2) and a recessed body (1) made from a high-resistance translucent material with ultraviolet protection, which has a general tubular configuration and includes an inner transversal wall (11) that separates a rear cavity (12), designed for housing the lighting elements (3), from a front cavity (13), in which the front plate is mounted. This translucent front plate (2), made from tempered glass or polycarbonate has at least one cut (21) on its side surface for lodging part of the material that makes up the recessed body (1) while such recessed body is being formed.

4 Claims, 1 Drawing Sheet

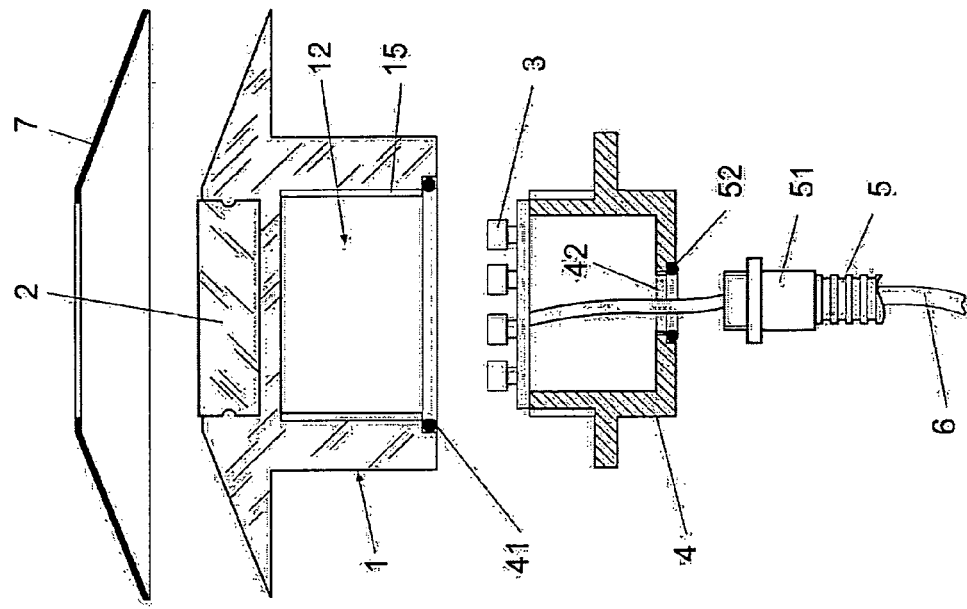
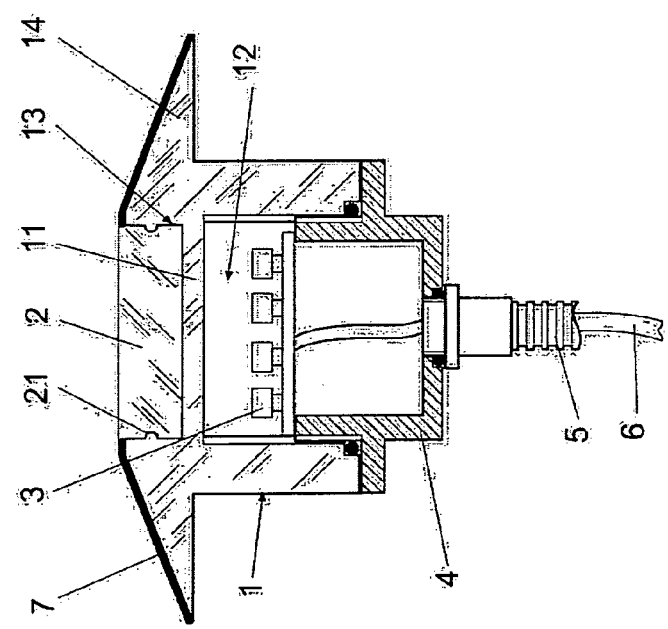

RECESSED LIGHTING FIXTURE

OBJECT OF THE INVENTION

This invention refers to a recessed lighting fixture, of the type that has a recessed body with an inner cavity designed for housing the lighting elements and a front plate made of translucent material to allow the light through to the outside.

BACKGROUND OF THE INVENTION

Recessed lighting fixtures, designed to be recessed in floors or walls, are generally made up of a metal body with a tubular configuration, which defines an inner cavity for housing the lighting elements and, on the outside, a perimeter flange that acts as the recess limit of the aforementioned tubular body in the floor or the surface in question.

In these lighting fixtures, the tubular body is closed off at the front end by means of a front plate made of translucent material, through which the light generated by the lighting elements is projected to the outside. This plate of translucent material is generally made of glass, and its assembly to the tubular body requires using special glues and gaskets that ensure, on one hand, that it is correctly attached and, on the other hand, the necessary watertightness to prevent water and damp from reaching the lighting elements located inside the device.

Therefore, in these recessed lighting fixtures, the inner cavity is separated from the outside only by the aforementioned glass plate. In these devices, when the glass plate breaks, the inner cavity is left completely unprotected and in contact with the exterior, which gives rise to a number of problems, among which the following are notable: the possibility of damp entering the inner chamber that houses the electric lighting elements and the risk of electrocution accidents in the event that a person inserts their fingers or a piece of conductive material in the cavity that houses the lighting elements.

In this kind of recessed fixtures, the power supply cables generally access the inner cavity through the opening defined in the rear end of the recessed body, which does not include the necessary elements to prevent water and damp from entering the lighting fixture through the same rear opening.

DESCRIPTION OF THE INVENTION

The recessed lighting fixture that is the object of this invention has a series of special manufacturing features that aim to guarantee the watertightness of the inner cavity that houses the lighting elements, to prevent access to such cavity from the front, even in the event that the front protection plate should break, and to provide extra protection for the lighting elements against ultraviolet radiation.

For this purpose, it has been determined that the recessed body should be made from a high-resistance translucent material, which has a general tubular configuration and includes an inner transversal wall that separates the rear cavity, designed for housing the lighting elements, from a front cavity that lodges the translucent front plate, and which is defined when injecting the material intended to form the recessed body around the aforementioned translucent front plate.

Since the recessed body is made out of a high-resistance translucent material, it allows the light generated by the lighting elements to pass through the transversal wall that separates the rear cavity from the front cavity, which houses the translucent front plate. This transversal wall acts as a barrier in the case that the translucent front plate should break, preventing water and damp from entering the rear cavity, as well as fingers and metal elements from being inserted, thus doing away with the risk of electrocution.

In accordance with the invention, the rear cavity has a rear access opening, which is threaded on the inside so that a sealing lid and a matching gasket can be placed. Such lid has a threaded hole for installation of a gasket and a gland box connected to a pipe through which the power supply cables for the lighting elements can access the inner cavity.

These elements create a seal on the rear opening of the device that prevents water and damp from entering the rear cavity through the aforementioned opening.

The device of the invention also includes a trim ring made from opaque material designed to cover the front area of the recessed fixture, except in the area where the translucent front plate is located. Given the translucent nature of the material that makes up the recessed body, this plate prevents the light from coming out sideways through the material that makes up the perimeter flange or recess limit.

The front plate made from translucent material has at least one perimeter cut on its side surface to lodge a part of the material that makes up the recessed body while it is being formed. This perimeter cut prevents the front plate from coming loose from the recessed body, guaranteeing its final attachment with no need to use special glues or any other similar substances.

In this invention, it has been planned that the front plate may be made out of tempered glass or polycarbonate and that the front body may be made out of polycarbonate or any other high-resistance translucent substance with ultraviolet protection. This ultraviolet protection allows the transversal wall to prevent excessive wear of the lighting elements when the recessed fixture is installed in a location that receives direct sunlight.

DESCRIPTION OF THE DRAWINGS

In order to complete the description provided and facilitate understanding of the features of the invention, a set of drawings have been enclosed with this descriptive report, which represent the following for illustrative purposes in a non-exhaustive manner:

FIG. 1 shows a front view of the recessed device, entirely assembled, with the trim ring, front plate, recessed body and rear lid sectioned in the vertical plane.

FIG. 2 is an exploded view of the elements shown in the previous drawing.

PREFERRED IMPLEMENTATION OF THE INVENTION

In the implementation example shown in the figures, the recessed lighting fixture includes a recessed body (1) made from polycarbonate with ultraviolet protection, which has a general tubular configuration and an inner transversal wall (11) which separates the rear cavity (12), designed for housing the lighting elements (3), from the front cavity (13), in which a translucent tempered-glass or polycarbonate front plate (2) is inserted.

The aforementioned front cavity (13) is defined when injecting the polycarbonate that makes up the recessed body (1) around the translucent part (2). This translucent part (2) has a perimeter cut or notch (21) which lodges a part of the material that makes up the recessed body (1) guaranteeing that the translucent plate (2) is fully immobilized in relation to the recessed body (1).

The recessed body (1) has a perimeter flange (14) on the outside, which acts as a recess limit, and in the rear cavity (12) an inner thread (15) for placing the rear lid (4), with the matching gasket (41).

The rear lid (4) includes a threaded hole (42) for installing the corrugated pipe (5) through which the power supply cables (6) of the lighting elements (3) can access the rear cavity (12).

The corrugated pipe (5) is placed in the threaded hole (42) in the lid by means of a gland or stuffing box (51), which is joined to the aforementioned pipe (5) and is responsible for pressing the gasket (52) against the rear lid (4).

This recessed fixture also includes a trim ring (7) made from an opaque material, which covers the front of the perimeter flange or recess limit (14), and the light generated by the lighting elements (3) comes out through the transversal wall (11) and the translucent plate (2).

Having sufficiently described the nature of the invention and an example of preferred implementation, it is stated with the necessary formalities that the materials, shape, size and layout of the described elements may be modified, as long as this does not entail any variation of the essential features of the invention, as claimed below.

The invention claimed is:

1. A recessed lighting fixture comprising: a translucent front plate (2) having a perimeter notch (21); and a recessed body (1) made from a high-resistance translucent material with ultraviolet protection, and which has a general tubular configuration, including an inner transversal wall (11) which separates a rear cavity (12), designed for housing lighting elements (3), from a front cavity (13); the translucent front plate (2) only, being in the inner cavity (13) and the notch (21) receiving a part of the material that makes up the recessed body (1) while the recessed body is being formed by injecting of the recessed body around the front plate to immobilize the front plate in the inner cavity.

2. A recessed lighting fixture, according to claim 1, wherein the rear cavity (12) has a rear access opening which is threaded on the inside (15) to receive a sealing lid (4) with a matching gasket (41); and where the lid (4) has a threaded hole (42) for placing a gasket (52) and a stuffing box (51) joined to a pipe (5) through which power supply cables (6) for the lighting elements (3) access the rear cavity (12).

3. A recessed lighting fixture, according to claim 1, wherein the front plate (2) is made from tempered glass or polycarbonate.

4. A recessed lighting fixture comprising: a translucent front plate (2) having a perimeter notch (21); and a recessed body (1) made from a high-resistance translucent material with ultraviolet protection, and which has a general tubular configuration, including an inner transversal wall (11) which separates a rear cavity (12), designed for housing lighting elements (3), from a front cavity (13); the translucent front plate (2) only, being in the inner cavity (13) and the notch (21) receiving a part of the material that makes up the recessed body (1) while the recessed is formed by injecting of the recessed body around the front plate to immobilize the front plate in the inner cavity; the rear cavity (12) having a rear access opening which is threaded on the inside (15) to receive a sealing lid (4) with a matching gasket (41); and where the lid (4) has a threaded hole (42) for placing a gasket (52) and a stuffing box (51 ) joined to a pipe (5) through which power supply cables (6) for the lighting elements (3) access the rear cavity (12).

* * * * *